United States Patent
Fujikawa et al.

(10) Patent No.: US 8,017,262 B2
(45) Date of Patent: *Sep. 13, 2011

(54) LITHIUM SECONDARY BATTERY WITH POROUS HEAT-RESISTANT LAYER

(75) Inventors: Masato Fujikawa, Moriguchi (JP); Shinji Kasamatsu, Katano (JP); Hajime Nishino, Ikoma (JP); Hideharu Takezawa, Katano (JP); Mikinari Shimada, Yawata (JP)

(73) Assignee: Panasonic Corporation, Osaka (JP)

( * ) Notice: Subject to any disclaimer, the term of this patent is extended or adjusted under 35 U.S.C. 154(b) by 765 days.

This patent is subject to a terminal disclaimer.

(21) Appl. No.: 11/339,617

(22) Filed: Jan. 26, 2006

(65) Prior Publication Data

US 2006/0286439 A1   Dec. 21, 2006

(30) Foreign Application Priority Data

Jun. 15, 2005  (JP) .................................. 2005-174585

(51) Int. Cl.
*H01M 10/02* (2006.01)
*H01M 2/16* (2006.01)

(52) U.S. Cl. ... 429/144; 429/129; 429/142; 429/231.95; 429/247

(58) Field of Classification Search .................. None
See application file for complete search history.

(56) References Cited

U.S. PATENT DOCUMENTS

| 5,705,292 | A | * | 1/1998 | Yukita et al. .................. 429/137 |
|---|---|---|---|---|
| 5,948,464 | A | | 9/1999 | Delnick | |
| 6,053,953 | A | | 4/2000 | Tomiyama et al. | |
| 6,110,619 | A | | 8/2000 | Zhang et al. | |
| 6,638,988 | B2 | | 10/2003 | Takata et al. | |
| 6,660,432 | B2 | | 12/2003 | Paulsen et al. | |
| 6,964,828 | B2 | | 11/2005 | Lu et al. | |
| 2002/0102455 | A1 | * | 8/2002 | Daroux et al. ................. 429/144 |
| 2004/0029012 | A1 | * | 2/2004 | Tanizaki et al. .......... 429/231.95 |
| 2004/0106040 | A1 | | 6/2004 | Fukuoka et al. | |
| 2005/0214637 | A1 | | 9/2005 | Imachi et al. | |

FOREIGN PATENT DOCUMENTS

JP        07-220759    *    1/1994

(Continued)

OTHER PUBLICATIONS

Oct. 9, 2007 Office Action in copending U.S. Appl. No. 11/473,328.

(Continued)

*Primary Examiner* — Ula C. Ruddock
*Assistant Examiner* — Tony Chuo
(74) *Attorney, Agent, or Firm* — McDermott Will & Emery LLP

(57) ABSTRACT

A lithium secondary battery including: an electrode group, a non-aqueous electrolyte and a battery case housing the electrode group and the non-aqueous electrolyte, the electrode group including a positive electrode, a negative electrode and a separator layer interposed between the positive electrode and the negative electrode, wherein an end-of-charge voltage and an end-of-discharge voltage are set in such a manner that the electrode group has an energy density of not less than 700 Wh/L, the separator layer includes a porous heat-resistant layer, and a short circuit area A produced when an internal short circuit has occurred between the positive electrode and the negative electrode, and a reduced area B of the porous heat-resistant layer that is produced by heat generation satisfy $1 \leq (A+B)/A \leq 10$.

12 Claims, 1 Drawing Sheet

FOREIGN PATENT DOCUMENTS

| | | |
|---|---|---|
| JP | 7-29602 A | 1/1995 |
| JP | 09-237622 A | 9/1997 |
| JP | 11-260338 A | 9/1999 |
| JP | 2000-100408 A | 4/2000 |
| JP | 2000-100408 A | 4/2000 |
| JP | 2000-223107 A | 8/2000 |
| JP | 2001-266949 A | 9/2001 |
| JP | 2004-014127 A | 1/2004 |
| JP | 2005-85635 A | 3/2005 |

OTHER PUBLICATIONS

Aug. 22, 2007 Office Action in copending U.S. Appl. No. 10/555,657.

H. Kim et al. Electrochemical and physical properties of composite polymer electrolyte of poly (methyl methacrylate) and poly (ethylene glycol diacrylate). Journal of Power Sources. 2003. pp. 221-224. 124.

T. Ohzuku et al. "Layered Lithium Insertion Material of $LiNi_{1/2}Mn_{1/2}O_2$: A Possible Alternative to $LiCoO_2$ for Advanced Lithium-Ion Batteries". Chemistry Letters. 2001. pp. 744-745. The Chemical Society of Japan.

T. Ohzuku et al. "Layered Lithium Insertion Material of $LiCo_{1/3}Ni_{1/3}Mn_{1/3}O_2$ for Lithium-Ion Batteries". Chemistry Letters. 2001. pp. 642-643. The Chemical Society of Japan.

United States Office Action issued in U.S. Appl. No. 11/473,328 dated Feb. 16, 2011.

* cited by examiner

F I G. 1
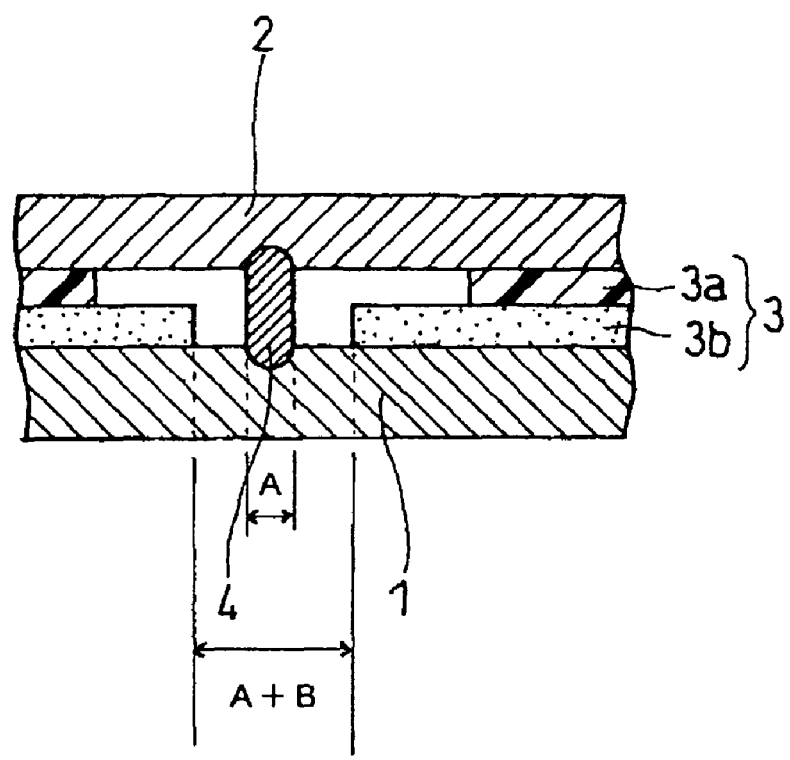

LITHIUM SECONDARY BATTERY WITH POROUS HEAT-RESISTANT LAYER

FIELD OF THE INVENTION

The present invention relates to a lithium secondary battery including an electrode group with a high energy density, and more particularly to a lithium secondary battery having excellent short circuit resistance.

BACKGROUND OF THE INVENTION

Lithium secondary batteries are attracting attention as high-capacity power sources, and are considered to be promising particularly as power sources for portable devices. A commonly used lithium secondary battery includes an electrode group, a non-aqueous electrolyte and a battery case housing the electrode group and the non-aqueous electrolyte. The electrode group includes a positive electrode, a negative electrode and a porous resin membrane interposed between the electrodes. The porous resin membrane serves to provide electronic insulation between the positive electrode and the negative electrode, and to retain the non-aqueous electrolyte. For example, the positive electrode includes lithium cobaltate as its active material, whereas the negative electrode includes graphite as its active material.

At present, studies aiming at providing even higher capacity for lithium secondary batteries are being carried out. However, the theoretical capacity of lithium cobaltate used as the positive electrode active material is about 150 mAh/g, and that of graphite used as the negative electrode active material is about 370 mAh/g. These theoretical capacities cannot be considered very high. Thus, it is difficult to stably supply lithium secondary batteries including an electrode group with an energy density of not less than 700 Wh/L. Therefore, the use of active materials with high theoretical capacities are being investigated.

For example, there has been proposed a lithium secondary battery including an electrode group in which Si is used as the negative electrode active material (Japanese Laid-Open Patent Publication No. Hei 7-29602). There has also been proposed to set the end-of-charge voltage of a lithium secondary battery to high so as to increase the utilization rate of the positive electrode active material, thereby attaining a high capacity (Japanese Laid-Open Patent Publication No. 2005-85635). In addition, the energy density of a lithium secondary battery can be increased by using a lithium-containing composite oxide containing Ni element as the positive electrode active material.

BRIEF SUMMARY OF THE INVENTION

As described above, there has been a demand for stable supply of lithium secondary batteries including an electrode group with an energy density of not less than 700 Wh/L, recently. However, the thermal energy released during an internal short circuit increases with an increase in the energy density of the electrode group. In particular, the safety significantly decreases during an internal short circuit resulting from a nail penetration test.

The present invention was made in view of the foregoing problems, and it is an object of the invention to improve the safety during an internal short circuit and the storage characteristics of a lithium secondary battery having a high energy density.

That is, the present invention relates to a lithium secondary battery comprising: an electrode group, a non-aqueous electrolyte and a battery case housing the electrode group and the non-aqueous electrolyte, the electrode group including a positive electrode, a negative electrode and a separator layer interposed between the positive electrode and the negative electrode, wherein an end-of-charge voltage and an end-of-discharge voltage are set in such a manner that the electrode group has an energy density of not less than 700 Wh/L, the separator layer includes a porous heat-resistant layer, and a short circuit area A produced when an internal short circuit has occurred between the positive electrode and the negative electrode, and a reduced area B of the porous heat-resistant layer that is produced by heat generation satisfy $1 \leq (A+B)/A \leq 10$.

The present invention also relates to a charge/discharge system including the above lithium secondary battery.

Here, "short circuit area A" refers to the defective area of the separator layer that has resulted from a short circuit and is observed immediately after the occurrence of that short circuit (i.e. before the occurrence of melting or burning of the separator layer). On the other hand, "reduced area B" refers to the area of the porous heat-resistant layer that has been melted or burned out by the heat generated by the short circuit. For example, in the case of a nail penetration test, the cross-sectional area S of the nail perpendicular to the length direction thereof corresponds to the short circuit area A. Further, the defective area of the porous heat-resistant layer that is observed when 30 seconds or more have passed since the nail penetration corresponds to A+B.

It should be noted that "nail penetration test" is a test in which a nail is put into a completed battery so as to penetrate the positive electrode, the negative electrode and the separator layer simultaneously, thereby forcibly forming a short circuit portion.

The porous heat-resistant layer may be formed on the surface of the negative electrode, the positive electrode or a porous resin membrane.

The separator layer may include a single or plural layers of the porous heat-resistant layer.

The separator layer may include only the porous heat-resistant layer, or may include the porous heat-resistant layer and the porous resin membrane.

When the separator layer includes the porous heat-resistant layer and the porous resin membrane, it is preferable that the porous heat-resistant layer has an area (dimension) that is larger than that of the active material layer of the negative electrode. It should be noted that the negative electrode includes a sheet-shaped current collector and a negative electrode active material layer supported on the current collector. Here, the area of the active material layer of the negative electrode refers to the area of the active material layer supported on one side of the negative electrode, rather than the total area of the active material layers supported on both sides of the negative electrode.

The sheet-shaped current collector of the negative electrode has the shape of a band having a predetermined width and a predetermined length. Similarly, the negative electrode active material layer has the shape of a band having a predetermined width and a predetermined length. The positive electrode also includes a sheet-shaped current collector and a positive electrode active material layer supported on the current collector. The sheet-shaped current collector of the positive electrode has the shape of a band having a predetermined width and a predetermined length. Similarly, the positive electrode active material layer has the shape of a band having a predetermined width and a predetermined length. The electrode group is formed by rolling up the positive electrode and the negative electrode with the separator layer disposed between the electrodes.

When the separator layer includes the porous heat-resistant layer and the porous resin membrane, it is preferable that the porous heat-resistant layer is formed on a surface of the positive electrode or the porous resin membrane.

When the porous heat-resistant layer is formed on the surface of the porous resin membrane, it is preferable that porous heat-resistant layer is disposed on the positive electrode side of the porous resin membrane.

For example, the porous heat-resistant layer may include an insulating filler and a binder, or may include a heat-resistant resin.

The negative electrode may include, for example, at least one selected from the group consisting of a lithium metal and a substance capable of being alloyed with lithium.

The positive electrode may include, for example, a lithium-containing composite oxide containing Ni element.

The present invention is particularly effective when the end-of-charge voltage of the lithium secondary battery is set to a voltage higher than 4.2 V.

Preferably, the separator layer has a thickness of 10 to 20 μm.

Preferably, the porous heat-resistant layer has a thickness of 1 to 20 μm.

Preferably, the porous resin membrane has a thickness of 8 to 18 μm.

In the case where a short circuit has occurred between the positive electrode and the negative electrode, conventional separator layers will be melted by heat generated, since they only include a porous resin membrane. Consequently, the area of the short circuit portion increases to the total of the short circuit area A and the reduced area of the separator layer, further increasing the amount of heat generated. The amount of heat generated at the time of occurrence of a short circuit significantly increases when the energy density of the electrode group exceeds 700 Wh/L. Particularly, when an internal short circuit has occurred during storage in a high temperature environment and the short circuit portion expands, then the heat generation is greatly accelerated. On the other hand, the separator layer according to the present invention includes the porous heat-resistant layer, and the reduced area B of the porous heat-resistant layer that has resulted from the heat generated during a short circuit is limited to a small amount. Accordingly, it is possible to reduce the duration of a short circuit, thereby suppressing the increase of the amount of heat generated, or the acceleration of the heat generation. Thus, according to the present invention, it is possible to provide a lithium secondary battery that offers a high level of safety in case of an internal short circuit and excellent storage characteristics, while having a high energy density.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

FIG. 1 is a cross-sectional view schematically showing the vicinity of a short circuit portion of a lithium secondary battery according to the present invention.

DETAILED DESCRIPTION OF THE INVENTION

The lithium secondary battery according to the present invention includes an electrode group, a non-aqueous electrolyte and a battery case housing the electrode group and the non-aqueous electrolyte. The electrode group includes a positive electrode, a negative electrode and a separator layer interposed between the positive electrode and the negative electrode. The electrode group has an energy density of not less than 700 Wh/L. The separator layer includes a porous heat-resistant layer. The short circuit area A produced when an internal short circuit has occurred between the positive electrode and the negative electrode and the reduced area B of the porous heat-resistant layer that has resulted from that internal short circuit satisfy $1 \leq (A+B)/A \leq 10$.

An internal short circuit tends to occur, for example, when conductive foreign matter is incorporated between the positive electrode and the negative electrode. Usually, the safety during an internal short circuit is evaluated by a nail penetration test. In a nail penetration test, when a nail simultaneously penetrates the positive electrode, the negative electrode and the separator layer, a short circuit portion is formed.

For commonly used conventional lithium secondary batteries, only a porous resin membrane is used as the separator layer. The porous resin membrane is composed only of a polyolefin, or contains a polyolefin as the main component (e.g. contains a polyolefin at not less than 95 wt %). Accordingly, the porous resin membrane has low heat resistance, and thus tends to be melted by heat generated. Consequently, the short circuit portion dramatically expands, relative to the short circuit area A, and the amount of heat generated suddenly increases. On the other hand, the separator layer according to the present invention includes the porous heat-resistant layer, and the porous heat-resistant layer is difficult to be melted or burned out by heat generated. Accordingly, it is possible to prevent the increase of the amount of heat generated owing to an expanded short circuit portion or the acceleration of heat generation, resulting in a significantly improved resistance to an internal short circuit.

FIG. 1 is a cross-sectional view schematically showing the vicinity of a short circuit portion produced when an internal short circuit has occurred between a positive electrode and a negative electrode. A positive electrode 1 and a negative electrode 2 are arranged alternately with a separator layer 3 disposed between them. The separator layer 3 includes a porous resin membrane 3a and a porous heat-resistant layer 3b. If conductive foreign matter 4 penetrates the separator layer 3, then a short circuit portion is formed between the positive electrode 1 and the negative electrode 2. The lithium secondary battery of the present invention includes an electrode group having a high energy density of not less than 700 Wh/L. Accordingly, when a short circuit portion is formed in a state where the chemical potential of the positive electrode 1 and the negative electrode 2 is high (i.e. a state where the battery is charged), a large amount of heat is generated, leading to melting, elimination or deformation of the porous heat-resistant layer 3b at its part in the vicinity of the short circuit portion. As a result, the defective area of the separator layer 3 (i.e. the area of the short circuit portion) increases to the total of the short circuit area A and the reduced area B of the porous heat-resistant layer 3b. When the separator layer 3 includes a porous resin membrane 3a, the porous resin membrane 3a will have a greater area reduction than the porous heat-resistant layer 3b. Thus, the defective area of the separator layer 3 (i.e. the area of the short circuit portion) A+B can be in effect regarded as the defective area of the porous heat-resistant layer 3b.

When the electrode group has an energy density of not less than 700 Wh/L, the amount of heat generation increases acceleratingly if the defective area of the porous heat-resistant layer expands to the extent that $10 < (A+B)/A$. Particularly, in the case of a battery placed under a high temperature environment, the amount of the current resulting from the short circuit increases since the internal resistance is reduced at high temperatures, so that amount of heat generation increases significantly. Accordingly, the safety of the battery during an internal short circuit is rapidly reduced. On the other hand, when $(A+B)/A \leq 10$, it is possible to suppress the heat generation to a minimum even if the chemical potential of the positive electrode and the negative electrode is high. In order to suppress the heat generation effectively, it is preferable that $(A+B)/A \leq 7$.

Additionally, the porous heat-resistant layer includes a heat-resistant material. Examples of the heat-resistant material include an inorganic oxide, a ceramic and a heat-resistant resin. These may be used alone or in combination of two or more of them. Here, it is preferable that the heat-resistant resin has a heat deformation temperature of not less than 260° C. Here, "heat deformation temperature" refers to a deflection temperature under load determined under a load of 1.82 MPa in accordance with the testing method ASTM-D648 of American Society for Testing and Materials. It is also preferable that the heat-resistant resin has a glass transition temperature (Tg) of not less than 130° C.

The separator layer may include a single or plural layers of the above-described porous heat-resistant layer.

For example, the porous heat-resistant layer is formed on the surface of the negative electrode, the positive electrode or the porous resin membrane. However, the porous heat-resistant layer may be formed on the surfaces of the negative electrode and the positive electrode, the surfaces of the positive electrode and the porous resin membrane, the surfaces of the porous resin membrane and the negative electrode, or the surfaces of the negative electrode, the positive electrode and the porous resin membrane. The porous heat-resistant layer may also be interposed between the positive electrode and the negative electrode in the form of a sheet that is independent of the negative electrode, the positive electrode and the porous resin membrane.

It is preferable that the separator layer includes the porous heat-resistant layer and the porous resin membrane, instead of including only the porous heat-resistant layer. Since the porous resin membrane includes a polyolefin, it has flexibility. Accordingly, the separator layer including the porous heat-resistant layer and the porous resin membrane is more durable than the separator layer including only the porous heat-resistant layer. Further, the porous resin membrane is also superior in the capability of retaining the non-aqueous electrolyte.

From the viewpoint of preventing contact between the positive electrode and the negative electrode, it is preferable that the porous heat-resistant layer is formed on the surface of the negative electrode. The reason is that the area of the negative electrode is usually larger than that of the positive electrode.

In addition, regardless of whether the porous heat-resistant layer is formed on the surface of the negative electrode, it is preferable that the area of the porous heat-resistant layer is made larger than that of the active material layer of the negative electrode. That is to say, it is preferable that the area of the porous heat-resistant layer is made larger than that of the active material layer of the negative electrode also when the porous heat-resistant layer is formed on the surface of the positive electrode or the porous resin membrane, from the viewpoint of improving the reliability of the battery. By making the area of the porous heat-resistant layer larger than that of the active material layer of the negative electrode, even if the electrode group is distorted as a result of repeated charge/discharge or storage, contact between the positive electrode and the negative electrode is prevented, thus making it possible to suppress the decrease in the battery voltage.

When the separator layer includes the porous heat-resistant layer and the porous resin membrane, it is preferable that the porous heat-resistant layer is formed on the surface of the positive electrode, or on the surface of the porous resin membrane.

When conductive foreign matter adheres onto the surface of the positive electrode in the electrode group, the foreign matter is dissolved during the subsequent charge/discharge, and thus tends to be re-deposited on the surface of the negative electrode. In this case, there is the possibility that the deposit on the negative electrode may grow and eventually reach the positive electrode. When such a short circuit occurs, an abnormal voltage drop occurs in the battery. On the other hand, when the porous heat-resistant layer is formed on the surface of the positive electrode, a high potential area on the surface of the positive electrode is protected by the porous heat-resistant layer, even if conductive foreign matter enters into the electrode group. Therefore, the foreign matter becomes difficult to be dissolved, and therefore is difficult to be deposited on the surface of the negative electrode. Accordingly, it is possible to prevent an abnormal voltage drop in the battery.

When the porous heat-resistant layer is formed on the surface of the porous resin membrane, the porous heat-resistant layer and the porous resin membrane are integrated in one piece, so that the separator layer has an increased strength, facilitating the formation of the electrode group and thus improving the productivity of the battery.

When the porous heat-resistant layer is formed on the surface of the porous resin membrane, it is also preferable that the porous heat-resistant layer is disposed on the positive electrode side of the porous resin membrane. The polyolefin (e.g. polyethylene or polypropylene) included in the porous resin membrane may be oxidized under high voltage and high temperature environment. When the polyolefin is oxidized on the surface of the porous resin membrane, there is the possibility that the porous resin membrane may be denatured, or cause clogging, leading to the deterioration of the battery characteristics. On the other hand, by disposing the porous heat-resistant layer on the positive electrode side of the porous resin membrane, the porous resin membrane is protected from the positive electrode, making it possible to prevent the porous resin membrane from being deteriorated by the positive electrode potential.

In addition, the voids within the electrode group tend to decrease with an increase in the energy density of the electrode group. Further, the porous resin membrane is compressed owing to the expansion and contraction of the electrodes during charge/discharge, so that the electrolyte has a greater tendency to be extruded from the electrode group. Therefore, the ionic conductivity within the electrodes tends to decrease. The decrease of the ionic conductivity is more prominent in the positive electrode, which generally has fewer voids than the negative electrode. On the other hand, when the porous heat-resistant layer, which is difficult to be compressed, is disposed on the positive electrode side, it is possible to secure the electrolyte abundantly in the vicinity of the positive electrode, thus making it possible to maintain favorable characteristics.

In the case of using high-capacity materials for the positive electrode and the negative electrode for the purpose of increasing the energy density, an alloy material (e.g. a silicon alloy or a tin alloy), a silicon oxide (e.g. SiO) or the like can be suitably used for the negative electrode active material.

However, a high-capacity material undergoes great expansion and contraction during charge/discharge. Therefore, when the porous heat-resistant layer is disposed on the negative electrode side, there is the possibility that the porous heat-resistant layer may be damaged. In view of the foregoing standpoints, it is preferable that the porous heat-resistant layer is disposed on the positive electrode side.

Although there is no particular limitation with respect to the porous heat-resistant layer, the porous heat-resistant layer may include, for example, an insulating filler and a binder, or may comprise a heat-resistant resin. The porous heat-resistant layer including an insulating filler and a binder has relatively high mechanical strength and hence high durability. Here, the porous heat-resistant layer including an insulating filler and a binder contains the insulating filler as the main component. For example, the insulating filler constitutes not less than 80 wt % of the porous heat-resistant layer. The porous heat-resistant layer comprising a heat-resistant resin includes the heat-resistant resin at more than 20 wt %, for example.

It should be noted that the porous heat-resistant layer comprising a heat-resistant resin has higher flexibility than the porous heat-resistant layer containing an insulating filler as the main component. The reason is that the heat-resistant resin is more flexible than the insulating filler. Therefore, the porous heat-resistant layer comprising a heat-resistant resin can more easily accommodate itself to the expansion and contraction of the electrode plate that results from charge/discharge, and therefore can maintain high heat resistance. Accordingly, it provides a high level of safety against nail penetration.

The porous heat-resistant layer comprising a heat-resistant resin may include an insulating filler at less than 80 wt %, for example. Inclusion of an insulating filler can provide a porous heat-resistant layer with well-balanced flexibility and durability. The heat-resistant resin contributes to the flexibility of the porous heat-resistant layer, whereas the insulating filler, which has high mechanical strength, contributes to the durability. Inclusion of an insulating filler in the porous heat-resistant layer improves the high output characteristics of the battery. Although the details are unknown, the reason seems to be that the void structure of the porous heat-resistant layer is optimized by a synergetic effect produced by flexibility and durability. From the viewpoint of ensuring good high output characteristics, it is preferable that the porous heat-resistant layer comprising a heat-resistant resin includes an insulating filler at 25 wt % to 75 wt %.

The porous heat-resistant layer can be provided by casting the source material of the porous heat-resistant layer onto the surface of at least one of the positive electrode, the negative electrode and the porous resin membrane. When the porous heat-resistant layer is in the form of an independent sheet, the sheet constituted by the porous heat-resistant layer is disposed between the positive electrode and the negative electrode, between the positive electrode and the porous resin membrane, or between the negative electrode and the porous resin membrane.

Specifically, the porous heat-resistant layer can be formed, for example, as follows:

(i) An insulating filler and a binder are mixed with a liquid component to prepare a paste or slurry, which is then applied onto the surface of at least one of the positive electrode, the negative electrode and the porous resin membrane, followed by removal of the liquid component by drying. The amount of the binder is preferably, but not limited to, 0.5 to 10 parts by weight per 100 parts by weight of the insulating filler.

The insulating filler, the binder and the liquid component are mixed using a double arm kneader, for example. The obtained paste or slurry is applied onto the surface of the electrodes or the porous resin membrane with a doctor blade or a die coater, for example.

(ii) A resin solution in which a heat-resistant resin is dissolved in a solvent is applied onto the surface of at least one of the positive electrode, the negative electrode and the porous resin membrane, followed by removal of the solvent by drying. The solvent in which the heat-resistant resin is dissolved is preferably, but not limited to, a polar solvent such as N-methyl-2-pyrrolidone (hereinafter, abbreviated as "NMP"). Not more than 500 parts by weight (preferably 33 parts by weight to 300 parts by weight) of the insulating filler per 100 parts by weight of the heat-resistant resin may be dispersed in the resin solution.

(iii) As in (i) described above, an insulating filler and a binder are mixed with a liquid component to prepare a paste or slurry, which is then applied onto a flat substrate, followed by removal of the liquid component by drying. Then, a sheet constituted by the porous heat-resistant layer including the insulating filler and the binder is peeled from the substrate, and disposed between the electrodes, or between one of the electrodes and the porous resin membrane. For example, a glass plate or a plate made of stainless steel (SUS) is used as the substrate.

(iv) As in (ii) described above, a resin solution in which a heat-resistant resin is dissolved in a solvent is applied onto a flat substrate, followed by removal of the solvent by drying. Then, a sheet constituted by the porous heat-resistant layer including the heat-resistant resin is peeled from the substrate, and disposed between the electrodes, or between one of the electrodes and the porous resin membrane.

(v) Nonwoven fabric made of a material with a high thermal decomposition starting temperature is disposed between the electrodes, or between one of the electrodes and the porous resin membrane.

When the porous heat-resistant layer has sufficient insulation properties and sufficient electrolyte retention capability, it is not necessary to use the porous resin membrane. It is also possible to use plural porous heat-resistant layers selected from (i) to (v) above in combination. For example, it is possible to integrate the porous heat-resistant layer described in (i) or (iii) with the porous heat-resistant layer described in (ii) or (iv) in one piece.

While there is no particular limitation with respect to the insulating filler included in the porous heat-resistant layer, it is possible to use an inorganic oxide or a ceramic, for example. It is also possible to use a fibrous heat-resistant resin. Among these, an inorganic oxide is particularly preferable. As the inorganic oxide, it is preferable to use alumina, silica, titania, zirconia, magnesia, yttria or the like, from the viewpoint of the chemical stability in the environment inside the battery. These insulating fillers may be used alone or in combination of two or more of them. The median diameter of the insulating filler is preferably 0.05 to 10 μm.

While there is no particular limitation with respect to the binder included in the porous heat-resistant layer, it is possible to use, for example, polyvinylidene fluoride (hereinafter, abbreviated as "PVDF"), acrylic rubber particles, typified by BM-500B (trade name) manufactured by ZEON Corporation, or polytetrafluoroethylene (hereinafter, abbreviated as "PTFE"). In the case of using PTFE or BM-500B, it is preferable to use them in combination with carboxymethyl cellulose (hereinafter, abbreviated as "CMC"), polyethylene oxide (hereinafter, abbreviated as "PEO") or a modified acrylonitrile rubber, typified by BM-720H (trade name) manufactured by ZEON Corporation as the thickener for the paste or slurry. These binders may be used alone or in combination of two or more of them.

While there is no particular limitation with respect to the heat-resistant resin constituting the porous heat-resistant layer, it is possible to use, for example, aramid, polyamide imide and cellulose. These heat-resistant resins may be used alone or in combination of two or more of them. The heat-resistant resins may also be used in combination with other resins.

The lithium secondary battery according to the present invention includes an electrode group having an energy density of not less than 700 Wh/L. Therefore, it is desirable to use materials having a high theoretical capacity as the active material of each of the positive electrode and the negative electrode. Further, it is desirable that the amount of optional components (e.g. a binder and a conductive agent) included in the electrodes is as small as possible.

Usually, the negative electrode includes an active material and a sheet-shaped current collector (core member) carrying the active material. For the negative electrode current collector, it is preferable to use a copper foil, and the thickness of the foil may be, for example, 5 to 50 μm. As the negative electrode active material, it is possible to use various substances that have been conventionally used as the negative electrode active material of lithium secondary batteries. Specifically, it is possible to use, for example, a carbon material (e.g. graphite), a substance capable of being alloyed with lithium, and lithium metal. However, from the viewpoint of increasing the capacity, it is preferable to use a substance capable of being alloyed with lithium and/or lithium metal. Examples of the substance capable of being alloyed with lithium include a Si-containing substance (e.g. a substance composed simply of Si, $SiO_x$ ($0<x<2$)), a substance composed simply of Sn, SnO and Ti. As the lithium metal, it is possible to use a lithium alloy such as Li—Al, in addition to a substance composed simply of lithium. These negative electrode active materials may be used alone or in combination of two or more of them. In addition, although it is possible to directly vapor-deposit the negative electrode active material on the current collector, it is also possible to carry a material mixture containing the active material and a small amount of optional components on the current collector. Examples of the optional components include a binder (e.g. PVDF and polyacrylic acid) and a conductive agent (e.g. acetylene black).

Usually, the positive electrode includes an active material and a sheet-shaped current collector (core member) carrying the active material. For the positive electrode current collector, it is preferable to use an aluminum foil, and the thickness of the aluminum foil may be, for example, 10 to 30 μm. As the positive electrode active material, it is possible to use various substances that have been conventionally used as the positive electrode active material of lithium secondary batteries. Specifically, it is possible to use, for example, a lithium-containing transition metal oxide such as lithium cobaltate, lithium nickelate or lithium manganate. It is possible to partly replace the transition metal of the lithium-containing transition metal oxide with another element. It is also possible to coat the surface of particles of the oxide with another element. However, from the viewpoint of increasing the capacity, it is more preferable that the positive electrode active material includes a lithium-containing composite oxide containing Ni element (e.g. $LiNiO_2$ or $LiNi_{1/3}Mn_{1/3}Co_{1/3}O_2$). It is possible to partly replace the Ni element with another element. It is also possible to use a mixture of a lithium-containing composite oxide containing Ni element and a material not containing Ni element. These positive electrode active materials may be used alone or in combination of two or more of them. It is preferable that the positive electrode is formed by carrying a material mixture including the positive electrode active material and a small amount of a binder (e.g. PVDF or BM-500B) on the current collector. When the binder is PVDF, it is preferable to select a high molecular weight PVDF, which can exert adhesion capability even in a small amount. It is possible to add a small amount of carbon black or the like as a conductive agent to the positive electrode material mixture. The total amount of the binder and the conductive agent is preferably 2 to 8 parts by weight per 100 parts by weight of the positive electrode active material.

In order to increase the energy density of the electrode group, it is possible to set the end-of-charge voltage of the battery to a voltage higher than 4.2 V, which is usually used. When the end-of-charge voltage is set to a voltage higher than 4.2 V, the utilization rate of the positive electrode is increased even for a combination of a positive electrode and a negative electrode having relatively low theoretical capacities, so that it is possible to increase the average voltage of the battery. Accordingly, the energy density of the battery is increased.

The thickness of the separator layer is preferably 10 to 20 μm. When the thickness of the separator layer is too small, the electronic insulation between the positive electrode and the negative electrode may decrease. On the other hand, when the thickness of the separator layer is too large, the design capacity of the battery decreases, or the electrode group becomes difficult to be inserted into the battery case. When the thickness of the separator layer is 10 to 20 μm, it is possible to provide a battery of a high capacity design, and to maintain sufficient electronic insulation between the positive electrode and the negative electrode.

The thickness of the porous heat-resistant layer is preferably 1 to 20 μm, regardless of the presence or absence of the porous resin membrane. When the thickness of the porous heat-resistant layer is less than 1 μm, it may not be possible to sufficiently achieve the effect of improving the resistance of the battery to an internal short circuit. On the other hand, when the thickness of the porous heat-resistant layer exceeds 20 μm, the porous heat-resistant layer may become brittle. When the thickness of the porous heat-resistant layer is too large, it may be difficult to provide an electrode group having an energy density of not less than 700 Wh/L. When the thickness of the porous heat-resistant layer is 1 to 20 μm, it is possible to provide a battery having a high energy density and well-balanced characteristics.

The thickness of the porous resin membrane is preferably 8 to 18 μm. When the thickness of the porous resin membrane is less than 8 μm, it may be difficult to maintain the electronic insulation between the positive electrode and the negative electrode if the thickness of the porous heat-resistant layer is small. On the other hand, when the thickness of the porous resin membrane exceeds 18 μm, it may be difficult to provide an electrode group having an energy density of not less than 700 Wh/L. When the thickness of the porous resin membrane is 8 to 18 μm, it is possible to provide a battery having a high energy density and well-balanced characteristics.

Next, the design standard of the lithium secondary battery and the method for calculating the energy density will be described in detail.

The theoretical capacity of the positive electrode can be determined as follows:

First, a cell is assembled using a part of the fabricated positive electrode (a positive electrode piece). The weight of the active material included in the positive electrode piece can be determined by calculation, for example. After the weight of the positive electrode active material is determined, a Li foil in an amount excessive to the theoretical capacity of the positive electrode piece is placed facing the positive electrode piece, and the whole is immersed in a good amount of an electrolyte, thereby obtaining a cell. This cell is subjected to charge/discharge in a voltage range defined by an end-of-discharge voltage and an end-of-charge voltage that are respectively 0.1 V higher than the end-of-discharge voltage and the end-of-charge voltage defining the working voltage range of the battery. For example, when the working voltage range of the desired lithium secondary battery is from 3.0 to 4.2 V (i.e. end-of-discharge voltage: 3.0 V, an end-of-charge voltage: 4.2 V), the cell is subjected to charge/discharge in a voltage range from 3.1 to 4.3 V (i.e. end-of-discharge voltage: 3.1 V, end-of-charge voltage: 4.3 V). The theoretical capacity per unit weight (mAh/g) of the positive electrode active material can be determined from the discharge capacity obtained at the second cycle. The theoretical capacity of the positive electrode is the product of the weight of the active material included in the positive electrode and the theoretical capacity per unit weight of the positive electrode active material.

The theoretical capacity of the negative electrode can be determined as follows:

First, a cell is assembled using a part of the fabricated negative electrode (a negative electrode piece). The weight of the active material included in the negative electrode piece can be determined by calculation, for example. After the weight of the negative electrode active material is determined, a Li foil in an amount excessive to the theoretical capacity of the negative electrode piece is placed facing the negative electrode piece, and the whole is immersed in a good amount of an electrolyte, thereby obtaining a cell. This cell is subjected to charge/discharge in a voltage range from 0 to 1.5 V (i.e. end-of-discharge voltage: 0 V, end-of-charge voltage: 1.5 V), with respect to the electric potential of Li metal. The theoretical capacity per unit weight (mAh/g) of the negative electrode active material can be determined from the charge capacity obtained at the second cycle. The theoretical capacity of the negative electrode is the product of the weight of the active material included in the negative electrode and the theoretical capacity per unit weight of the negative electrode active material.

By determining the theoretical capacity from the charge capacity obtained at the second cycle, the amount of Li captured into the negative electrode active material that corresponds to the irreversible capacity can be reflected in the theoretical capacity. Here, "charge" means a reaction in which lithium is desorbed from the negative electrode active material. When lithium metal is used for the negative electrode, the theoretical capacity of the negative electrode can be directly determined from the weight of the Li metal used. However, from the viewpoint of optimizing the battery characteristics, it is preferable that the design capacity is set to 40% of the weight of the Li metal used. When lithium metal is used for the negative electrode, no current collector will be used for the negative electrode, so that it becomes difficult to maintain the shape of the negative electrode if the battery is designed such that the whole amount of lithium metal is reacted. In addition, it is possible to use an active material having an irreversible capacity in combination with lithium metal, and to compensate for the irreversible capacity of that active material by the lithium metal.

Next, using the positive electrode and the negative electrode whose theoretical capacities have been clearly determined, a battery is designed by the following procedure.

First, from the viewpoint of optimizing the battery life, the design capacity of the positive electrode is set to 0.97 times the theoretical capacity of the positive electrode. The design capacity of the negative electrode is set to 105% of the design capacity of the positive electrode in the working voltage range of the desired lithium secondary battery. Next, from the viewpoint of improving the process yield, the cross-sectional area of the electrode group is set to $(0.95)^2$ times the cross-sectional area of the internal space of the battery case housing that electrode group.

Here, in the case of a cylindrical battery, the energy density (Wh/L) of the electrode group can be determined using the formula: $1000 \times \alpha \times \beta/(\gamma \times \pi \times (0.95\epsilon/2)^2)$. However, The theoretical capacity (0.97×theoretical capacity of the positive electrode) of the battery is taken as $\alpha$ (Ah), the intermediate voltage (the voltage at which one half of the amount of the initial battery capacity has been discharged) during discharge is taken as $\beta$ (V), the width of the negative electrode active material layer is taken as $\gamma$ (cm), and the inner diameter of the battery case is taken as $\epsilon$ (cm). It should be noted that the theoretical capacity of the battery means the same as the design capacity of the positive electrode.

In the case of a square battery, the energy density (Wh/L) of the electrode group can be determined using the formula: $1000 \times \alpha \times \beta/(\gamma \times 0.95^2 \times \epsilon)$. However, the theoretical capacity (0.97×theoretical capacity of the positive electrode) of the battery is taken as $\alpha$ (Ah), the intermediate voltage (the voltage at which one half of the amount of the initial battery capacity has been discharged) during discharge is taken as $\beta$ (V), the width of the negative electrode active material layer is taken as $\gamma$ (cm), and the area of the inner bottom surface of the battery case is taken as $\epsilon$ (cm$^2$).

As the non-aqueous electrolyte and the battery case, it is possible to use those that have conventionally been used for lithium secondary batteries. It is also possible to apply publicly known techniques that have been conventionally used for lithium secondary batteries to the lithium secondary battery of the present invention.

As the non-aqueous electrolyte, it is preferable to use a non-aqueous solvent in which a lithium salt is dissolved as the solute.

As the lithium salt, it is possible to use, for example, lithium hexafluorophosphate (LiPF$_6$), lithium perchlorate (LiClO$_4$), lithium tetrafluoroborate (LiBF$_4$), LiAlCl$_4$, LiSbF$_6$, LiSCN, LiCl, LiCF$_3$SO$_3$, LiCF$_3$CO$_2$, Li(CF$_3$SO$_2$)$_2$, LiAsF$_6$, LiN(CF$_3$SO$_2$)$_2$, LiB$_{10}$Cl$_{10}$, lithium lower aliphatic carboxylate, LiCl, LiBr, LiI, lithium tetrachloroborate, lithium tetraphenylborate and a lithium imide salt. These may be used alone or in combination of two or more of them. While there is no particular limitation with respect to the amount of the lithium salt dissolved in the non-aqueous solvent, the concentration of the lithium salt is preferably 0.2 to 2 mol/L, more preferably 0.5 to 1.5 mol/L.

As the non-aqueous solvent, it is possible to use, for example, cyclic carbonates such as ethylene carbonate (EC), propylene carbonate (PC) and butylene carbonate (BC), non-cyclic carbonates such as dimethyl carbonate (DMC), diethyl carbonate (DEC), ethylmethyl carbonate (EMC) and dipropyl carbonate (DPC), aliphatic carboxylic acid esters such as methyl formate, methyl acetate, methyl propionate and ethyl propionate, lactones such as γ-butyrolactone and γ-valerolactone, non-cyclic ethers such as 1,2-dimethoxyethane (DME), 1,2-diethoxyethane (DEE) and ethoxymethoxyethane (EME), cyclic ethers such as tetrahydrofuran and 2-methyltetrahydrofuran, dimethyl sulfoxide, 1,3-dioxolane, formamide, acetamide, dimethylformamide, dioxolane, acetonitrile, propionitrile, nitromethane, ethyl monoglyme, phosphoric acid triester, trimethoxymethane, a dioxolane derivative, sulfolane, methylsulfolane, 1,3-dimethyl-2-imidazolidinone, 3-methyl-2-oxazolidinone, a propylene carbonate derivative, a tetrahydrofuran derivative, ethyl ether, 1,3-propanesultone, anisole, dimethyl sulfoxide and N-methyl-2-pyrrolidone. Although these may be used alone, it is preferable to mix two or more of them. Among these, it is preferable to use a mixed solvent of a cyclic carbonate and a non-cyclic carbonate, or a mixed solvent of a cyclic carbonate, a non-cyclic carbonate and an aliphatic carboxylic acid ester.

A variety of additives may be added for the purpose of improving the charge/discharge characteristics of the battery. As the additive, it is preferable to use, for example, vinylene carbonate (VC), vinyl ethylene carbonate (VEC), cyclohexylbenzene (CHB) and fluorobenzene. These additives form a good coating on the positive electrode and/or negative electrode, thus improving the stability at the time of overcharge.

The battery case should be electrochemically stable in the working voltage range of the lithium secondary battery. For example, it is preferable to use a battery case made of iron, and the battery case may also be plated with nickel or tin. After the electrode group is inserted into the battery case, the non-aqueous electrolyte is injected into the battery case. Then, the opening of the battery case is sealed by clamping, with a lid placed at the opening, thereby a lithium secondary battery is completed.

Hereinafter, the present invention will be described specifically by way of examples.

EXAMPLES

Example 1

A lithium secondary battery was designed such that its working voltage range was from 2.5 V to 4.2 V (end-of-discharge voltage: 2.5 V, end-of-charge voltage: 4.2 V).

(i) Production of Positive Electrode

A positive electrode material mixture paste was prepared by stirring, with a double arm kneader, 5 kg of a lithium nickelate powder (median diameter: 20 μm) serving as a positive electrode active material, 1 kg of an N-methyl-2-pyrrolidone (NMP) solution (#1320 (trade name) manufactured by KUREHA CORPORATION) containing 12 wt % of polyvinylidene fluoride (PVDF) serving as a binder, 90 g of acetylene black serving as a conductive agent and a suitable amount of NMP serving as a dispersion medium. The positive electrode material mixture paste was applied onto both sides of a band-shaped positive electrode current collector comprising an aluminum foil with a thickness of 15 μm. The applied positive electrode material mixture paste was dried, and rolled with rollers to form a positive electrode active material layer. The obtained electrode plate was cut into a width (57 mm) that could be inserted into a cylindrical battery case (diameter: 18 mm, height: 65 mm, inner diameter: 17.85 mm), thereby obtaining a positive electrode.

(ii) Production of Negative Electrode

A negative electrode material mixture paste was prepared by stirring, with a double arm kneader, 3 kg of a powder composed simply of silicon (Si) (median diameter: 10 μm) serving as a negative electrode active material, 750 g of an aqueous dispersion (BM-400B (trade name) manufactured by ZEON Corporation) containing 40 wt % of modified styrene butadiene rubber particles serving as a binder, 600 g of acetylene black serving as a conductive agent, 300 g of carboxymethyl cellulose (CMC) serving as a thickener and a suitable amount of water serving as a dispersion medium. The negative electrode material mixture paste was applied onto both sides of a band-shaped negative electrode current collector comprising a copper foil with a thickness of 10 μm. The applied negative electrode material mixture paste was dried, and rolled with rollers to form a negative electrode active material layer. The obtained electrode plate was cut into a width (58.5 mm) that could be inserted into the battery case, thereby obtaining a negative electrode. It should be noted that the width of the negative electrode and that of the negative electrode active material layer were the same.

(iii) Formation of Porous Heat-Resistant Layer

A heat-resistant layer slurry was prepared by stirring, with a double arm kneader, 970 g of an alumina powder (median diameter: 0.3 μm), 375 g of an NMP solution (BM-720H (trade name) manufactured by ZEON Corporation) containing 8 wt % of a modified polyacrylonitrile rubber serving as a binder and a suitable amount of NMP serving as a dispersion medium. The heat-resistant layer slurry was applied onto the surface of the positive electrode so as to cover the positive electrode active material layer. The applied heat-resistant layer slurry was dried for 10 hours at 120° C. under vacuum and reduced pressure to form a porous heat-resistant layer. The thickness of the porous heat-resistant layer was 5 μm.

(iv) Assembly of Battery

The positive electrode and the negative electrode having the porous heat-resistant layer were rolled up with a 14 μm thick porous resin membrane made of polyethylene (Hipore (trade name) manufactured by Asahi Kasei Corporation) interposed between them, thus forming an electrode group. Accordingly, the separator layer was constituted by the porous heat-resistant layer and the porous resin membrane, and the total thickness of the porous heat-resistant layer and the porous resin membrane was 19 μm.

After the electrode group was inserted into a cylindrical nickel plated battery case made of iron (diameter: 18 mm, height: 65 mm, inner diameter: 17.85 mm), 5.0 g of a non-aqueous electrolyte was injected into the battery case, and the opening of the battery case was sealed with a lid, thereby completing a lithium secondary battery. A non-aqueous electrolyte in which $LiPF_6$ was dissolved in a mixed solvent of ethylene carbonate (EC), dimethyl carbonate (DMC) and ethylmethyl carbonate (EMC) at a concentration of 1 mol/L was used as the non-aqueous electrolyte. The volume ratio of EC:DMC:EMC in the mixed solvent was 1:1:1. 3 wt % of vinylene carbonate (VC) was added to the non-aqueous electrolyte. The theoretical capacity of the battery was 3606 mAh, and the energy density of the electrode group was 928 Wh/L.

Example 2

A lithium secondary battery was fabricated in the same manner as Example 1, except that a SiO powder (median diameter: 8 μm) was used in place of the powder composed simply of silicon, and that the dimensions of the positive electrode and the negative electrode were changed as necessary based on the above-described design standard (i.e. with the working voltage range of the lithium secondary battery being set to 2.5 V to 4.2 V, and the volume of the electrode group being set to be the same as that in Example 1). The theoretical capacity of the battery was 3203 mAh, and the energy density of the electrode group was 824 Wh/L.

Example 3

A negative electrode material mixture paste was prepared by stirring, with a double arm kneader, 4 kg of a powder composed simply of tin (Sn) (median diameter: 10 μm) serving as a negative electrode active material, 250 g of an aqueous dispersion (BM-400B (trade name) manufactured by ZEON Corporation) containing 40 wt % of modified styrene butadiene rubber particles serving as a binder, 200 g of acetylene black serving as a conductive agent, 100 g of carboxymethyl cellulose (CMC) serving as a thickener and a suitable amount of water serving as a dispersion medium. A lithium secondary battery was fabricated in the same manner as Example 1, except that this negative electrode material mixture paste was used, and that the dimensions of the positive electrode and the negative electrode were changed as necessary based on the above-described design standard. The theoretical capacity of the battery was 3395 mAh, and the energy density of the electrode group was 873 Wh/L.

Example 4

A lithium secondary battery was fabricated in the same manner as Example 1, except that a 140 μm thick lithium metal foil was used for the negative electrode, and that the dimensions of the positive electrode and the negative electrode were changed as necessary based on the above-described design standard. The theoretical capacity of the battery was 3242 mAh, and the energy density of the electrode group was 932 Wh/L.

Example 5

A lithium secondary battery was fabricated in the same manner as Example 1, except that a 5 μm thick vapor-deposited film of lithium metal was formed on the surface of the negative electrode, and that the dimensions of the positive electrode and the negative electrode were changed as necessary based on the above-described design standard. The theoretical capacity of the battery was 3529 mAh, and the energy density of the electrode group was 908 Wh/L.

Example 6

A lithium secondary battery was fabricated in the same manner as Example 2, except that a 5 μm thick vapor-deposited film of lithium metal was formed on the surface of the negative electrode, and that the dimensions of the positive electrode and the negative electrode were changed as necessary based on the above-described design standard. The theoretical capacity of the battery was 3135 mAh, and the energy density of the electrode group was 807 Wh/L.

Examples 7 to 10

Lithium secondary batteries of Examples 7, 8, 9 and 10 were fabricated in the same manner as Examples 5, 6, 4 and 1, respectively, except that the porous heat-resistant layer was not formed on the surface of the positive electrode, but was formed on the surface of the negative electrode so as to cover the negative electrode active material layer.

Examples 11 to 13

Lithium secondary batteries of Examples 11, 12 and 13 were fabricated in the same manner as Example 1, except that the alumina in the porous heat-resistant layer was changed to magnesia, silica and zirconia having substantially the same particle size distribution as the alumina in Examples 11, 12 and 13, respectively.

Example 14

A lithium secondary battery was fabricated in the same manner as Example 1, except that the thickness of the separator layer was changed to 22 μm by changing the thicknesses of the porous heat-resistant layer and the porous resin membrane to 2 μm and 20 μm, respectively, and that the dimensions of the positive electrode and the negative electrode were changed as necessary based on the above-described design standard. The theoretical capacity of the battery was 3510 mAh, and the energy density of the electrode group was 903 Wh/L.

Example 15

A lithium secondary battery was fabricated in the same manner as Example 1, except that the thickness of the separator layer was changed to 20 μm by changing the thicknesses of the porous heat-resistant layer and the porous resin membrane to 2 μm and 18 μm, respectively, and that the dimensions of the positive electrode and the negative electrode were changed as necessary based on the above-described design standard. The theoretical capacity of the battery was 3587 mAh, and the energy density of the electrode group was 923 Wh/L.

Example 16

A lithium secondary battery was fabricated in the same manner as Example 1, except that the thickness of the separator layer was changed to 16 μm by changing the thicknesses of the porous heat-resistant layer and the porous resin membrane to 2 μm and 14 μm, respectively, and that the dimensions of the positive electrode and the negative electrode were changed as necessary based on the above-described design standard. The theoretical capacity of the battery was 3702 mAh, and the energy density of the electrode group was 952 Wh/L.

Example 17

A lithium secondary battery was fabricated in the same manner as Example 1, except that the thickness of the separator layer was changed to 10 μm by changing the thicknesses of the porous heat-resistant layer and the porous resin membrane to 2 μm and 8 μm, respectively, and that the dimensions of the positive electrode and the negative electrode were changed as necessary based on the above-described design standard. The theoretical capacity of the battery was 3913 mAh and the energy density of the electrode group was 1007 Wh/L.

Example 18

A lithium secondary battery was fabricated in the same manner as Example 1, except that the thickness of the separator layer was changed to 8 μm by changing the thicknesses of the porous heat-resistant layer and the porous resin membrane to 2 μm and 6 μm, respectively, and that the dimensions of the positive electrode and the negative electrode were changed as necessary based on the above-described design standard. The theoretical capacity of the battery was 3970 mAh, and the energy density of the electrode group was 1021 Wh/L.

Example 19

A lithium secondary battery was fabricated in the same manner as Example 1, except that the thickness of the separator layer was changed to 24 μm by changing the thickness of the porous heat-resistant layer to 10 μm, and that the dimensions of the positive electrode and the negative electrode were changed as necessary based on the above-described design standard. The theoretical capacity of the battery was 3453 mAh, and the energy density of the electrode group was 888 Wh/L.

Example 20

A lithium secondary battery was fabricated in the same manner as Example 1, except that the thickness of the separator layer was changed to 15 µm by changing the thickness of the porous heat-resistant layer to 1 µm, and that the dimensions of the positive electrode and the negative electrode were changed as necessary based on the above-described design standard. The theoretical capacity of the battery was 3740 mAh, and the energy density of the electrode group was 962 Wh/L.

Example 21

A lithium secondary battery was fabricated in the same manner as Example 1, except that the thickness of the separator layer was changed to 14.5 µm by changing the thickness of the porous heat-resistant layer to 0.5 µm, and that the dimensions of the positive electrode and the negative electrode were changed as necessary based on the above-described design standard. The theoretical capacity of the battery was 3759 mAh, and the energy density of the electrode group was 967 Wh/L.

Example 22

A lithium secondary battery was fabricated in the same manner as Example 1, except that the porous heat-resistant layer was not formed on the surface of the positive electrode, but was formed on the surface (only one side) of the porous resin membrane, thus disposing the porous heat-resistant layer on the positive electrode side.

Example 23

A lithium secondary battery was fabricated in the same manner as Example 22, except that the porous heat-resistant layer was formed on the surface of the porous resin membrane by the following procedure.

First, 65 g of dry anhydrous calcium chloride was added to 1 kg of NMP, and the mixture was heated to 80° C. in a reaction vessel to completely dissolve the anhydrous calcium chloride. After the obtained NMP solution of calcium chloride was cooled down to ordinary temperature, 32 g of paraphenylenediamine was added to the solution, and completely dissolved. Thereafter, the reaction vessel was placed in a constant temperature bath at 20° C., and 58 g of dichloroterephthalate was added dropwise to the NMP solution over one hour. Then, the NMP solution was stood still for one hour in the constant temperature bath at 20° C. to allow a polymerization reaction to proceed, thus synthesizing polyparaphenylene terephthalamide (hereinafter, abbreviated as "PPTA").

After completion of the reaction, the NMP solution (polymerized solution) was moved from the constant temperature bath into a vacuum vessel, and degassed under stirring for 30 minutes under reduced pressure. Further, the obtained polymerized solution was diluted with an NMP solution of calcium chloride to prepare an NMP solution of aramid resin with a PPTA concentration of 1.4 wt %.

The obtained NMP solution of aramid resin was applied onto one side of the porous resin membrane with a doctor blade, and dried with hot air having 80° C. (air velocity: 0.5 m/sec). Thereafter, the aramid resin film was sufficiently washed with pure water to remove the calcium chloride, while forming micro pores in the film, and the film was dried. Thus, a porous heat-resistant layer with a thickness of 5 µm was formed on one side of the porous resin membrane. In addition, the aramid resin was removed from the NMP solution, and its heat deformation temperature (deflection temperature under load) measured in accordance with the ASTM was 321° C.

Example 24

A lithium secondary battery was fabricated in the same manner as Example 22, except that the porous heat-resistant layer was formed on the surface of the porous resin membrane by the following procedure.

First, 21 g of trimellitic acid anhydride monochloride and 20 g of diamine (diaminodiphenyl ether) were added to 1 kg of NMP, and the whole was mixed at room temperature to prepare an NMP solution of polyamic acid (polyamic acid concentration: 3.9 wt %). The obtained NMP solution of polyamic acid was applied onto one side of the porous resin membrane with a doctor blade. Thereafter, the coated film was dried with hot air having 80° C. (air velocity: 0.5 m/sec), while causing cyclodehydration of the polyamic acid to form polyamide imide. In addition, the heat deformation temperature (deflection temperature under load) of the polyamide imide measured in accordance with the ASTM was 280° C.

Examples 25 to 27

Lithium secondary batteries of Examples 25, 26 and 27 were fabricated in the same manner as Example 22, 23 and 24, respectively, except that the porous heat-resistant layer carried on the porous resin membrane was disposed on the negative electrode side.

Example 28

A lithium secondary battery was fabricated in the same manner as Example 22, except that the thickness of the separator layer was changed to 12.5 µm by changing the thicknesses of the porous resin membrane and the porous heat-resistant layer to 12 µm and 0.5 µm, respectively, and that the dimensions of the positive electrode and the negative electrode were changed as necessary based on the above-described design standard. The theoretical capacity of the battery was 3836 mAh, and the energy density of the electrode group was 987 Wh/L.

Example 29

A lithium secondary battery was fabricated in the same manner as Example 22, except that the thickness of the separator layer was changed to 13 µm by changing the thicknesses of the porous resin membrane and the porous heat-resistant layer to 12 µm and 1 µm, respectively, and that the dimensions of the positive electrode and the negative electrode were changed as necessary based on the above-described design standard. The theoretical capacity of the battery was 3817 mAh, and the energy density of the electrode group was 982 Wh/L.

Example 30

A lithium secondary battery was fabricated in the same manner as Example 22, except that the thickness of the separator layer was changed to 14 μm by changing the thicknesses of the porous resin membrane and the porous heat-resistant layer to 12 μm and 2 μm, respectively, and that the dimensions of the positive electrode and the negative electrode were changed as necessary based on the above-described design standard. The theoretical capacity of the battery was 3778 mAh, and the energy density of the electrode group was 972 Wh/L.

Example 31

A lithium secondary battery was fabricated in the same manner as Example 22, except that the thickness of the separator layer was changed to 17 μm by changing the thickness of the porous resin membrane to 12 μm, and that the dimensions of the positive electrode and the negative electrode were changed as necessary based on the above-described design standard. The theoretical capacity of the battery was 3683 mAh, and the energy density of the electrode group was 948 Wh/L.

Example 32

A lithium secondary battery was fabricated in the same manner as Example 22, except that the thickness of the separator layer was changed to 22 μm by changing the thicknesses of the porous resin membrane and the porous heat-resistant layer to 12 μm and 10 μm, respectively, and that the dimensions of the positive electrode and the negative electrode were changed as necessary based on the above-described design standard. The theoretical capacity of the battery was 3510 mAh, and the energy density of the electrode group was 903 Wh/L.

Example 33

The heat-resistant layer slurry was applied on to a smooth SUS plate, and the coated film was dried for 10 hours at 120° C. under vacuum and reduced pressure to form a porous heat-resistant layer with a thickness of 10 μm. This layer was removed from the SUS plate to give an independent sheet constituted by the porous heat-resistant layer. A lithium secondary battery was fabricated in the same manner as Example 1, except that the obtained sheet was disposed on the positive electrode side of the porous resin membrane, instead of forming the porous heat-resistant layer on the surface of the positive electrode, that the thickness of the separator layer was changed to 20 μm by changing the thickness of the porous resin membrane to 10 μm, and that the dimensions of the positive electrode and the negative electrode were changed as necessary based on the above-described design standard. In addition, the dimension of the porous heat-resistant layer was made larger than that of the negative electrode. The theoretical capacity of the battery was 3587 mAh, and the energy density of the electrode group was 923 Wh/L.

Example 34

The NMP solution of aramid resin with a PPTA concentration of 1.4 wt % was applied onto a smooth SUS plate, and the coated film was dried with hot air having 80° C. (air velocity: 0.5 m/sec). Thereafter, the aramid resin film was sufficiently washed with pure water, and dried again to form a 10 μm thick porous heat-resistant layer comprising the aramid resin. This layer was removed from the SUS plate to give an independent sheet constituted by the porous heat-resistant layer. A lithium secondary battery was fabricated in the same manner as Example 33, except that the thus obtained sheet was used.

Example 35

The NMP solution of polyamic acid was applied onto a smooth SUS plate, and the coated film was dried with hot air having 80° C. (air velocity: 0.5 m/sec), while causing cyclodehydration of the polyamic acid to produce polyamide imide, thus forming a 10 μm thick porous heat-resistant layer comprising the polyamide imide. This layer was removed from the SUS plate to give an independent sheet constituted by the porous heat-resistant layer. A lithium secondary battery was fabricated in the same manner as Example 33, except that the thus obtained sheet was used.

Example 36

A lithium secondary battery was fabricated in the same manner as Example 33, except that the porous resin membrane was not used, the thickness of the sheet constituted by the porous heat-resistant layer was changed to 14 μm, and that the dimensions of the positive electrode and the negative electrode were changed as necessary based on the above-described design standard. The theoretical capacity of the battery was 3768 mAh, and the energy density of the electrode group was 972 Wh/L.

Example 37

A lithium secondary battery was fabricated in the same manner as Example 33, except that the porous resin membrane was not used, the thickness of the sheet constituted by the porous heat-resistant layer was changed to 20 μm, and that the dimensions of the positive electrode and the negative electrode were changed as necessary based on the above-described design standard. The theoretical capacity of the battery was 3587 mAh, and the energy density of the electrode group was 923 Wh/L.

Example 38

A lithium secondary battery was fabricated in the same manner as Example 33, except that the porous resin membrane was not used, the thickness of the sheet constituted by the porous heat-resistant layer was changed to 22 μm, and that the dimensions of the positive electrode and the negative electrode were changed as necessary based on the above-described design standard. The theoretical capacity of the battery was 3510 mAh, and the energy density of the electrode group was 903 Wh/L.

Example 39

A lithium secondary battery was fabricated in the same manner as Example 34, except that the porous resin membrane was not used, that the thickness of the sheet constituted by the porous heat-resistant layer was changed to 14 μm, and that the dimensions of the positive electrode and the negative electrode were changed as necessary based on the above-described design standard.

Example 40

A lithium secondary battery was fabricated in the same manner as Example 35, except that the porous resin membrane was not used, that the thickness of the sheet constituted by the porous heat-resistant layer was changed to 14 μm, and that the dimensions of the positive electrode and the negative electrode were changed as necessary based on the above-described design standard.

Example 41

A lithium secondary battery was fabricated in the same manner as Example 36, except that a 16 μm thick nonwoven fabric made of cellulose was used in place of the sheet constituted by the porous heat-resistant layer, and that the dimensions of the positive electrode and the negative electrode were changed as necessary based on the above-described design standard. The theoretical capacity of the battery was 3702 mAh, and the energy density of the electrode group was 952 Wh/L.

Example 42

A lithium secondary battery was fabricated in the same manner as Example 1, except that the positive electrode was formed by the following procedure, and that the dimensions of the positive electrode and the negative electrode were changed as necessary based on the above-described design standard. The theoretical capacity of the battery was 3164 mAh, and the energy density of the electrode group was 838 Wh/L.

A positive electrode material mixture paste was prepared by stirring, with a double arm kneader, 3 kg of a lithium cobaltate powder (median diameter: 15 μm) serving as a positive electrode active material, 1 kg of an N-methyl-2-pyrrolidone (NMP) solution (#1320 (trade name) manufactured by KUREHA CORPORATION) containing 12 wt % of polyvinylidene fluoride (PVDF) serving as a binder, 90 g of acetylene black serving as a conductive agent and a suitable amount of NMP serving as a dispersion medium. The positive electrode material mixture paste was applied onto both sides of a band-shaped positive electrode current collector comprising an aluminum foil with a thickness of 15 μm. The applied positive electrode material mixture paste was dried, and rolled with rollers to form a positive electrode active material layer. The obtained electrode plate was cut into a width (57 mm) that could be inserted into a cylindrical battery case (diameter: 18 mm, height: 65 mm, inner diameter: 17.85 mm), thereby obtaining a positive electrode.

Example 43

A lithium secondary battery was fabricated in the same manner as Example 1, except that the positive electrode was formed by the following procedure, and that the dimensions of the positive electrode and the negative electrode were changed as necessary based on the above-described design standard. The theoretical capacity of the battery was 3129 mAh, and the energy density of the electrode group was 817 Wh/L.

A positive electrode material mixture paste was prepared by stirring, with a double arm kneader, 3 kg of a lithium nickel manganese cobalt oxide ($LiNi_{1/3}Mn_{1/3}Co_{1/3}O_2$) powder (median diameter: 15 μm) serving as a positive electrode active material, 1 kg of an N-methyl-2-pyrrolidone (NMP) solution (#1320 (trade name) manufactured by KUREHA CORPORATION) containing 12 wt % of polyvinylidene fluoride (PVDF) serving as a binder, 90 g of acetylene black serving as a conductive agent and a suitable amount of NMP serving as a dispersion medium. The positive electrode material mixture paste was applied onto both sides of a band-shaped positive electrode current collector comprising an aluminum foil with a thickness of 15 μm. The applied positive electrode material mixture paste was dried, and rolled with rollers to form a positive electrode active material layer. The obtained electrode plate was cut into a width (57 mm) that could be inserted into a cylindrical battery case (diameter: 18 mm, height: 65 mm, inner diameter: 17.85 mm), thereby obtaining a positive electrode.

Example 44

A lithium secondary battery was fabricated in the same manner as Example 1, except that the positive electrode was formed by the following procedure, and that the dimensions of the positive electrode and the negative electrode were changed as necessary based on the above-described design standard. The theoretical capacity of the battery was 3537 mAh, and the energy density of the electrode group was 923 Wh/L.

A positive electrode material mixture paste was prepared by stirring, with a double arm kneader, 1.5 kg of a lithium cobaltate powder (median diameter: 15 μm) serving as a first positive electrode active material, 1.5 kg of a lithium nickel manganese cobalt oxide ($LiNi_{1/3}Mn_{1/3}Co_{1/3}O_2$) powder (median diameter: 15 μm) serving as a second positive electrode active material, 1 kg of an N-methyl-2-pyrrolidone (NMP) solution (#1320 (trade name) manufactured by KUREHA CORPORATION) containing 12 wt % of polyvinylidene fluoride (PVDF) serving as a binder, 90 g of acetylene black serving as a conductive agent and a suitable amount of NMP serving as a dispersion medium. The positive electrode material mixture paste was applied onto both sides of a band-shaped positive electrode current collector comprising an aluminum foil with a thickness of 15 μm. The applied positive electrode material mixture paste was dried, and rolled with rollers to form a positive electrode active material layer. The obtained electrode plate was cut into a width (57 mm) that could be inserted into a cylindrical battery case (diameter: 18 mm, height: 65 mm, inner diameter: 17.85 mm), thereby obtaining a positive electrode.

Example 45

A lithium secondary battery was fabricated in the same manner as Example 1, except that the negative electrode was formed by the following procedure, and that the dimensions of the positive electrode and the negative electrode were changed as necessary based on the above-described design standard. The theoretical capacity of the battery was 2633 mAh, and the energy density of the electrode group was 717 Wh/L.

A negative electrode material mixture paste was prepared by stirring, with a double arm kneader, 3 kg of an artificial graphite powder (median diameter: 20 μm) serving as a negative electrode active material, 75 g of an aqueous dispersion (BM-400B (trade name) manufactured by ZEON Corporation) containing 40 wt % of modified styrene butadiene rubber particles serving as a binder, 30 g of carboxymethyl cellulose (CMC) serving as a thickener and a suitable amount of water serving as a dispersion medium. The negative electrode material mixture paste was applied onto both sides of a band-shaped negative electrode current collector comprising a copper foil with a thickness of 10 μm. The applied negative electrode material mixture paste was dried, and rolled with rollers to form a negative electrode active material layer. The obtained electrode plate was cut into a width (58.5 mm) that could be inserted into the battery case, thereby obtaining a negative electrode.

Example 46

A lithium secondary battery was fabricated in the same manner as Example 1, except that the battery design was changed such that the working voltage range of the lithium secondary battery was from 2.5 V to 4.4 V (end-of-discharge voltage: 2.5 V, end-of-charge voltage: 4.4 V), that the positive electrode was produced in the same manner as Example 42, that the negative electrode was produced in the same manner as Example 45, and that the dimensions of the positive electrode and the negative electrode were changed as necessary based on the above-described design standard. The theoretical capacity of the battery was 2514 mAh, and the energy density of the electrode group was 742 Wh/L.

Example 47

A lithium secondary battery was fabricated in the same manner as Example 1, except that the battery design was changed such that the working voltage range of the lithium secondary battery was from 2.5 V to 4.4 V (end-of-discharge voltage: 2.5 V, end-of-charge voltage: 4.4 V), that the positive electrode was produced in the same manner as Example 44, that the negative electrode was produced in the same manner as Example 45, and that the dimensions of the positive electrode and the negative electrode were changed as necessary based on the above-described design standard. The theoretical capacity of the battery was 2601 mAh, and the energy density of the electrode group was 728 Wh/L.

Comparative Example 1

A lithium secondary battery was fabricated in the same manner as Example 1, except that the thickness of the porous resin membrane was changed to 20 μm, that the porous heat-resistant layer was not provided, and that the dimensions of the positive electrode and the negative electrode were changed as necessary based on the above-described design standard. The theoretical capacity of the battery was 3587 mAh, and the energy density of the electrode group was 923 Wh/L.

Comparative Example 2

A lithium secondary battery was fabricated in the same manner as Example 46, except that the battery design was changed such that the working voltage range of the lithium secondary battery was from 2.5 V to 4.2 V (end-of-discharge voltage: 2.5 V, end-of-charge voltage: 4.2 V). The theoretical capacity of the battery was 2314 mAh, and the energy density of the electrode group was 648 Wh/L.

Example 48

A lithium secondary battery was fabricated in the same manner as Example 23, except that 200 parts by weight of an alumina powder was added to the NMP solution of aramid resin of Example 23, per 100 parts by weight of the aramid resin. As the alumina powder, the one used for the porous heat-resistant layer of Example 1 was used.

Example 49

A lithium secondary battery of Example 49 was fabricated in the same manner as Example 48, except that the porous heat-resistant layer carried on the porous resin membrane was disposed on the negative electrode side.

50 pieces of batteries each were fabricated for all the examples and the comparative examples, and they were evaluated as follows. Tables 1 to 3 show the constitution and the evaluation results for the batteries.

(Insulation Failure Test)

For each of the electrode groups to which the non-aqueous electrolyte had not been added, the direct current resistance was measured by application of a voltage of 25 V. The batteries including the electrode groups with a measured value of not more than 1 MΩ were regarded as batteries having an internal short circuit, and the rates of occurrence of such batteries are shown as "insulation failure rate" in Table 3.

(Voltage Failure Test)

The batteries having no internal short circuit were subjected to break-in charge/discharge twice, and subsequently subjected to charge with a current value of 400 mA until their voltages reached to 4.1 V. Thereafter, the batteries were stored for seven days under an environment with 45° C. The rates of occurrence of batteries whose open circuit voltage after storage decreased by 50 mV or more as compared with that before storage are shown as "voltage failure rate" in Table 3.

(High Output Characteristics)

The discharge capacity during high output discharge was determined by performing charge/discharge under an environment with 20° C. under the following conditions.

Constant Current Charge hourly rate: 0.7 C, end-of-charge voltage: design end voltage (4.2 V for Examples 1 to 45, 48 and 49 and Comparative Examples 1 and 2, 4.4 V for Examples 46 and 47)

Constant Voltage Charge charge voltage value: design end voltage, end-of-charge current: 100 mA Constant Current Discharge hourly rate: 0.2 C, end-of-discharge voltage: design end voltage (2.5 V)

Constant Current Charge hourly rate: 1 C, end-of-charge voltage: design end voltage Constant Voltage Charge charge voltage value: design end voltage, end-of-charge current: 100 mA Constant Current Discharge hourly rate: 2 C, end-of-discharge voltage: design end voltage Here, the hourly rate X (C) indicates that the theoretical capacity of the battery is discharged over 1/X hour, and a larger value of X indicates a larger current value. The ratios of the capacity during 2 C discharge to the capacity during 0.2 C discharge are shown as "high output characteristics" in Table 3.

(Storage Characteristics)

Each battery was subjected to charge/discharge under an environment with 20° C. under the following conditions, and then stored for 20 days under an environment with 60° C. Thereafter, each battery was subjected to charge/discharge under the following conditions. The ratios of the capacity during 1 C discharge after storage to the capacity during 1 C discharge before storage are shown as "storage characteristics" in Table 3.

Constant Current Charge hourly rate: 0.7 C, end-of-charge voltage: design end voltage+0.1 V Constant Voltage Charge charge voltage value: design end voltage+0.1 V, end-of-charge current: 100 mA Constant Current Discharge
  hourly rate: 1 C, end-of-discharge voltage: design end voltage
Constant Current Charge
  hourly rate: 0.7 C, end-of-charge voltage: design end voltage+0.1 V
Constant Voltage Charge
  charge voltage value: design end voltage+0.1 V, end-of-charge current: 100 mA
High Temperature Storage
  60° C., 20 days
Constant Current Discharge
  hourly rate: 0.2 C, end-of-discharge voltage: design end voltage
Constant Current Charge
  hourly rate: 0.7 C, end-of-charge voltage: design end voltage+0.1V
Constant Voltage Charge
  charge voltage value: design end voltage+0.1 V, end-of-charge current: 100 mA
Constant Current Discharge
  hourly rate: 1 C, end-of-discharge voltage: design end voltage (Nail Penetration Test)

Each battery was subjected to charge at 0.7 C until the voltage reached a voltage that was 0.1 V higher than the design end voltage. Thereafter, an iron nail (having a diameter of 2.5 mm of a cross section perpendicular to its length direction) was allowed to penetrate into each of the charged batteries from its side at a speed of 5 mm/sec under an environment with 20° C., and the heat generation state of the batteries was observed. The temperature of each battery was measured with a thermocouple attached on the side of the battery. The temperature that was reached after 90 seconds was shown in Table 3.

Further, each battery was disassembled after its temperature had dropped, and the short circuit area A (i.e. the cross-sectional area perpendicular to the length direction of the nail) and the reduced area B of the porous heat-resistant layer or the separator layer that resulted from an internal short circuit were measured. The maximum values of (A+B)/A were shown in Table 2.

TABLE 1

|    | Positive electrode active material | Negative electrode active material | Porous resin membrane (μm) | Porous heat-resistant layer Filler | Thickness (μm) |
|---|---|---|---|---|---|
| Ex. 1 | $LiNiO_2$ | Si | 14 | alumina | 5 |
| 2 | $LiNiO_2$ | SiO | 14 | alumina | 5 |
| 3 | $LiNiO_2$ | Sn | 14 | alumina | 5 |
| 4 | $LiNiO_2$ | Li | 14 | alumina | 5 |
| 5 | $LiNiO_2$ | Si + Li | 14 | alumina | 5 |
| 6 | $LiNiO_2$ | SiO + Li | 14 | alumina | 5 |
| 7 | $LiNiO_2$ | Si + Li | 14 | alumina | 5 |
| 8 | $LiNiO_2$ | SiO + Li | 14 | alumina | 5 |
| 9 | $LiNiO_2$ | Li | 14 | alumina | 5 |
| 10 | $LiNiO_2$ | Si | 14 | alumina | 5 |
| 11 | $LiNiO_2$ | Si | 14 | magnesia | 5 |
| 12 | $LiNiO_2$ | Si | 14 | silica | 5 |
| 13 | $LiNiO_2$ | Si | 14 | zirconia | 5 |
| 14 | $LiNiO_2$ | Si | 20 | alumina | 2 |
| 15 | $LiNiO_2$ | Si | 18 | alumina | 2 |
| 16 | $LiNiO_2$ | Si | 14 | alumina | 2 |
| 17 | $LiNiO_2$ | Si | 8 | alumina | 2 |
| 18 | $LiNiO_2$ | Si | 6 | alumina | 2 |
| 19 | $LiNiO_2$ | Si | 14 | alumina | 10 |
| 20 | $LiNiO_2$ | Si | 14 | alumina | 1 |
| 21 | $LiNiO_2$ | Si | 14 | alumina | 0.5 |
| 22 | $LiNiO_2$ | Si | 14 | alumina | 5 |
| 23 | $LiNiO_2$ | Si | 14 | aramid | 5 |
| 24 | $LiNiO_2$ | Si | 14 | polyamide imide | 5 |
| 25 | $LiNiO_2$ | Si | 14 | alumina | 5 |
| 26 | $LiNiO_2$ | Si | 14 | aramid | 5 |
| 27 | $LiNiO_2$ | Si | 14 | polyamide imide | 5 |
| 28 | $LiNiO_2$ | Si | 12 | aramid | 0.5 |
| 29 | $LiNiO_2$ | Si | 12 | aramid | 1 |
| 30 | $LiNiO_2$ | Si | 12 | aramid | 2 |
| 31 | $LiNiO_2$ | Si | 12 | aramid | 5 |
| 32 | $LiNiO_2$ | Si | 12 | aramid | 10 |
| 33 | $LiNiO_2$ | Si | 10 | alumina | 10 |
| 34 | $LiNiO_2$ | Si | 10 | aramid | 10 |
| 35 | $LiNiO_2$ | Si | 10 | polyamide imide | 10 |
| 36 | $LiNiO_2$ | Si | — | alumina | 14 |
| 37 | $LiNiO_2$ | Si | — | alumina | 20 |
| 38 | $LiNiO_2$ | Si | — | alumina | 22 |
| 39 | $LiNiO_2$ | Si | — | aramid | 14 |
| 40 | $LiNiO_2$ | Si | — | polyamide imide | 14 |
| 41 | $LiNiO_2$ | Si | — | cellulose | 16 |
| 42 | $LiCoO_2$ | Si | 14 | alumina | 5 |
| 43 | $LiNi_{1/3}Mn_{1/3}Co_{1/3}O_2$ | Si | 14 | alumina | 5 |

TABLE 1-continued

|  | Positive electrode active material | Negative electrode active material | Porous resin membrane (μm) | Porous heat-resistant layer Filler | Thickness (μm) |
|---|---|---|---|---|---|
| 44 | $LiNi_{1/3}Mn_{1/3}Co_{1/3}O_2 + LiCoO_2$ | Si | 14 | alumina | 5 |
| 45 | $LiNiO_2$ | graphite | 14 | alumina | 5 |
| 46 | $LiCoO_2$ | graphite | 14 | alumina | 5 |
| 47 | $LiNi_{1/3}Mn_{1/3}Co_{1/3}O_2 + LiCoO_2$ | graphite | 14 | alumina | 5 |
| 48 | $LiNiO_2$ | Si | 14 | alumina + aramid | 5 |
| 49 | $LiNiO_2$ | Si | 14 | alumina + aramid | 5 |
| Com Ex. 1 | $LiNiO_2$ | Si | 20 | — | — |
| Com Ex. 2 | $LiCoO_2$ | graphite | 14 | alumina | 5 |

TABLE 2

|  |  | Location of porous heat-resistant layer | End voltage (V) | Energy Density (Wh/L) | Short circuit area A (mm$^2$) | Reduced area B (mm$^2$) | (A + B)/A |
|---|---|---|---|---|---|---|---|
| Ex. | 1 | positive electrode | 4.2 | 928 | 5.0 | 26 | 5.2 |
|  | 2 | positive electrode | 4.2 | 824 | 5.0 | 24 | 4.8 |
|  | 3 | positive electrode | 4.2 | 873 | 5.0 | 27 | 5.4 |
|  | 4 | positive electrode | 4.2 | 932 | 5.0 | 28 | 5.6 |
|  | 5 | positive electrode | 4.2 | 908 | 5.0 | 26 | 5.2 |
|  | 6 | positive electrode | 4.2 | 807 | 5.0 | 24 | 4.8 |
|  | 7 | negative electrode | 4.2 | 908 | 5.0 | 45 | 9.0 |
|  | 8 | negative electrode | 4.2 | 807 | 5.0 | 42 | 8.4 |
|  | 9 | negative electrode | 4.2 | 932 | 5.0 | 40 | 8.0 |
|  | 10 | negative electrode | 4.2 | 928 | 5.0 | 42 | 8.4 |
|  | 11 | positive electrode | 4.2 | 928 | 5.0 | 27 | 5.4 |
|  | 12 | positive electrode | 4.2 | 928 | 5.0 | 29 | 5.8 |
|  | 13 | positive electrode | 4.2 | 928 | 5.0 | 25 | 5.0 |
|  | 14 | positive electrode | 4.2 | 903 | 5.0 | 34 | 6.8 |
|  | 15 | positive electrode | 4.2 | 923 | 5.0 | 35 | 7.0 |
|  | 16 | positive electrode | 4.2 | 952 | 5.0 | 37 | 7.4 |
|  | 17 | positive electrode | 4.2 | 1007 | 5.0 | 38 | 7.6 |
|  | 18 | positive electrode | 4.2 | 1021 | 5.0 | 40 | 8.0 |
|  | 19 | positive electrode | 4.2 | 888 | 5.0 | 21 | 4.2 |
|  | 20 | positive electrode | 4.2 | 962 | 5.0 | 33 | 6.6 |
|  | 21 | positive electrode | 4.2 | 967 | 5.0 | 47 | 9.4 |
|  | 22 | porous resin memb./pos. elec. side | 4.2 | 928 | 5.0 | 28 | 5.6 |
|  | 23 | porous resin memb./pos. elec. side | 4.2 | 928 | 5.0 | 26 | 5.2 |
|  | 24 | porous resin memb./pos. elec. side | 4.2 | 928 | 5.0 | 29 | 5.8 |
|  | 25 | porous resin memb./neg. elec. side | 4.2 | 928 | 5.0 | 31 | 6.2 |
|  | 26 | porous resin memb./neg. elec. side | 4.2 | 928 | 5.0 | 33 | 6.6 |
|  | 27 | porous resin memb./neg. elec. side | 4.2 | 928 | 5.0 | 29 | 5.8 |
|  | 28 | porous resin memb./pos.elec.side | 4.2 | 987 | 5.0 | 48 | 9.6 |
|  | 29 | porous resin memb./pos. elec. side | 4.2 | 982 | 5.0 | 43 | 8.6 |
|  | 30 | porous resin memb./pos. elec. side | 4.2 | 972 | 5.0 | 37 | 7.4 |
|  | 31 | porous resin memb./pos. elec. side | 4.2 | 948 | 5.0 | 30 | 6.0 |
|  | 32 | porous resin memb./pos. elec. side | 4.2 | 903 | 5.0 | 26 | 5.2 |
|  | 33 | independent | 4.2 | 923 | 5.0 | 14 | 2.8 |
|  | 34 | independent | 4.2 | 923 | 5.0 | 16 | 3.2 |
|  | 35 | independent | 4.2 | 923 | 5.0 | 10 | 2.0 |
|  | 36 | independent | 4.2 | 972 | 5.0 | 12 | 2.4 |
|  | 37 | independent | 4.2 | 923 | 5.0 | 10 | 2.0 |
|  | 38 | independent | 4.2 | 903 | 5.0 | 8 | 1.6 |
|  | 39 | independent | 4.2 | 972 | 5.0 | 11 | 2.2 |
|  | 40 | independent | 4.2 | 972 | 5.0 | 9 | 1.8 |
|  | 41 | independent | 4.2 | 952 | 5.0 | 38 | 7.6 |
|  | 42 | positive electrode | 4.2 | 838 | 5.0 | 24 | 4.8 |
|  | 43 | positive electrode | 4.2 | 817 | 5.0 | 24 | 4.8 |
|  | 44 | positive electrode | 4.2 | 923 | 5.0 | 30 | 6.0 |
|  | 45 | positive electrode | 4.2 | 717 | 5.0 | 28 | 5.6 |

TABLE 2-continued

|  |  | Location of porous heat-resistant layer | End voltage (V) | Energy Density (Wh/L) | Short circuit area A (mm²) | Reduced area B (mm²) | (A + B)/A |
|---|---|---|---|---|---|---|---|
|  | 46 | positive electrode | 4.4 | 742 | 5.0 | 29 | 5.8 |
|  | 47 | positive electrode | 4.4 | 728 | 5.0 | 31 | 6.2 |
|  | 48 | porous resin memb./pos. dec. side | 4.2 | 928 | 5.0 | 27 | 5.4 |
|  | 49 | porous resin memb./neg. elec. side | 4.2 | 928 | 5.0 | 32 | 6.4 |
| Com Ex. | 1 | — | 4.2 | 923 | 5.0 | 197 | 39.4 |
|  | 2 | positive electrode | 4.2 | 648 | 5.0 | 22 | 4.4 |

TABLE 3

|  |  | Battery temperature 90 sec. after nail penetration (° C.) | High output characteristics (%) | Storage characteristics (%) | Insulation failure rate (%) | Voltage failure rate (%) |
|---|---|---|---|---|---|---|
| Ex. | 1 | 92 | 90.2 | 92.1 | 0 | 2 |
|  | 2 | 88 | 91.3 | 90.5 | 0 | 2 |
|  | 3 | 84 | 90.5 | 91.3 | 0 | 2 |
|  | 4 | 86 | 92.2 | 89.7 | 0 | 4 |
|  | 5 | 84 | 91.8 | 88.6 | 0 | 0 |
|  | 6 | 88 | 90.3 | 90 | 0 | 2 |
|  | 7 | 112 | 90.5 | 84.6 | 0 | 16 |
|  | 8 | 118 | 91.2 | 84.7 | 0 | 18 |
|  | 9 | 115 | 89.8 | 83.6 | 0 | 20 |
|  | 10 | 121 | 90.1 | 85.1 | 0 | 8 |
|  | 11 | 90 | 90.1 | 90.5 | 0 | 2 |
|  | 12 | 92 | 90.7 | 91.8 | 0 | 0 |
|  | 13 | 93 | 90.5 | 90.9 | 0 | 2 |
|  | 14 | 87 | 82.2 | 90.5 | 0 | 0 |
|  | 15 | 90 | 87.2 | 91.2 | 0 | 2 |
|  | 16 | 92 | 90.5 | 91.4 | 2 | 0 |
|  | 17 | 99 | 92.3 | 92.2 | 8 | 10 |
|  | 18 | 101 | 95.2 | 92 | 18 | 20 |
|  | 19 | 78 | 79.7 | 87.2 | 0 | 0 |
|  | 20 | 95 | 92.8 | 88.5 | 0 | 2 |
|  | 21 | 131 | 93.3 | 85.2 | 0 | 6 |
|  | 22 | 98 | 90.8 | 90.1 | 0 | 0 |
|  | 23 | 89 | 91.5 | 89.8 | 0 | 2 |
|  | 24 | 90 | 90.7 | 90 | 0 | 4 |
|  | 25 | 99 | 91.2 | 80.5 | 0 | 0 |
|  | 26 | 87 | 90.1 | 82.2 | 0 | 6 |
|  | 27 | 88 | 90.3 | 83.4 | 0 | 6 |
|  | 28 | 128 | 91.5 | 90.2 | 0 | 4 |
|  | 29 | 100 | 90.1 | 91.3 | 0 | 6 |
|  | 30 | 90 | 88.6 | 90.2 | 0 | 6 |
|  | 31 | 82 | 86.5 | 89.6 | 0 | 4 |
|  | 32 | 78 | 80.3 | 88.5 | 0 | 4 |
|  | 33 | 80 | 88.6 | 90.1 | 0 | 12 |
|  | 34 | 82 | 88.5 | 87.5 | 0 | 10 |
|  | 35 | 79 | 88.8 | 86.9 | 0 | 14 |
|  | 36 | 95 | 92.1 | 90.5 | 6 | 12 |
|  | 37 | 82 | 87.4 | 92.3 | 6 | 8 |
|  | 38 | 74 | 79.2 | 91.4 | 4 | 10 |
|  | 39 | 89 | 91.9 | 90.6 | 4 | 8 |
|  | 40 | 91 | 92.4 | 91.2 | 4 | 10 |
|  | 41 | 98 | 90.8 | 90.6 | 8 | 2 |
|  | 42 | 86 | 89.2 | 90.1 | 0 | 2 |
|  | 43 | 91 | 90.5 | 89.8 | 0 | 0 |
|  | 44 | 90 | 90.5 | 90.9 | 0 | 0 |
|  | 45 | 95 | 90.2 | 90.5 | 0 | 0 |
|  | 46 | 95 | 92.1 | 85.5 | 0 | 0 |
|  | 47 | 98 | 91.1 | 94.9 | 0 | 2 |
|  | 48 | 91 | 92.8 | 89.6 | 0 | 0 |
|  | 49 | 90 | 92.6 | 82.7 | 0 | 2 |
| Com Ex. | 1 | 145 | 91.3 | 83.5 | 0 | 0 |
|  | 2 | 84 | 94.5 | 90.5 | 0 | 2 |

Both lithium cobaltate (the positive electrode active material) and graphite (the negative electrode active material) that were used in Comparative Example 2 have a low theoretical capacity. Accordingly, although batteries with well-balanced characteristics and high reliability were obtained, it was not possible to achieve the desired high energy density (700 Wh/L) when the end-of-charge voltage was 4.2 V. In order to achieve an electrode group having an energy density of not less than 700 Wh/L, it is necessary to use a negative electrode active material having a higher energy density than graphite, as in Examples 1 to 44, 48 and 49, or to use a positive electrode active material having a higher energy density than lithium cobaltate, as in Example 45, or to set the end-of-charge voltage to a voltage higher than 4.2 V, as in Examples 46 to 47.

In the case of Comparative Example 1, in which the separator layer did not include the porous heat-resistant layer, the separator layer had a large reduced area when an internal short circuit was caused in the nail penetration test, and a large amount of heat therefore was generated in the battery. It seems that the heat generated as a result of an internal short circuit caused the porous resin membrane having a low melting point to melt, thus expanding the short circuit portion, increasing the amount of the short circuit current and thus promoting the heat generation. On the other hand, in the examples of the present invention, in which the separator layer included the porous heat-resistant layer, it was possible to suppress the reduced area B of the porous heat-resistant layer to a small extent when an internal short circuit was caused in the nail penetration test. Thus, it was possible to suppress the heat generation in the batteries. As can be suggested from Examples 1 to 6, the effect of suppressing heat generation could be achieved regardless of the type of the negative electrode active material.

In the cases of Examples 7 to 10, in which the porous heat-resistant layer was provided on the surface of the negative electrode, a large amount of heat was generated in the batteries in the nail penetration test, and the voltage failure rate was somewhat higher. Additionally, the storage characteristics were lower. In the cases of Examples 1 to 6, in which the porous heat-resistant layer was provided on the surface of the positive electrode, and Examples 22 to 24, in which the porous heat-resistant layer was formed on the porous resin membrane, more favorable results were obtained. A negative electrode active material having a high energy density tends to undergo a significant volume change, or to experience a change of state. Therefore, it seems that, when the porous heat-resistant layer is formed on the surface of the negative electrode, the porous heat-resistant layer, which is structurally fragile, is partly damaged. In the cases of Examples 7 to 9, in which the negative electrode included lithium metal, the voltage failure rate was particularly high. The reason seems to be that the electric potential of the negative electrode was lowered by the presence of the lithium metal, and the conductive foreign matter dissolved in the positive electrode therefore was more easily deposited at the negative electrode. On the other hand, in the cases of Examples 4 to 6, in which the porous heat-resistant layer was provided on the surface of the positive electrode, the voltage failure rate was low, because the conductive foreign matter was difficult to be dissolved in the positive electrode.

The porous heat-resistant layers of Examples 1 to 22, 25, 33, 36 to 38 and 42 to 47 comprised an insulating filler and a binder, and therefore had a relatively high mechanical strength and high durability. In contrast, the porous heat-resistant layer of Examples 23, 26, 28 to 32, 34 and 39 comprised aramid resin, and thus were relatively inferior in the mechanical strength. This was also the same for the porous heat-resistant layers of Examples 24, 27, 35 and 40 that comprised polyamidoimide resin. Accordingly, the batteries including the porous heat-resistant layer comprising a heat-resistant resin had a relatively high voltage failure rate. However, the porous heat-resistant layers comprising a heat-resistant resin had high flexibility, so that their electrode groups were easy to form, leading to an improved productivity.

Further, as can be seen from a comparison of Examples 22 to 27, in which the porous heat-resistant layer was provided on the porous resin membrane, the use of the heat-resistant resin improved the heat resistance of the batteries and thus provided a higher safety against nail penetration than that provided by the use of the insulating filler. This seems to be due to the fact that the heat-resistant resin, which has higher flexibility than the insulating filler, can more easily accommodate itself to the expansion and contraction of the electrode plates during charge/discharge. In particular, in the cases of Example 48 and 49, in which the insulating filler and the heat-resistant resin were used in combination, there were observed improved high output characteristics, in addition to the merit of the insulating filler (a lower voltage failure rate) and that of the heat-resistant resin (an improved safety against nail penetration). It seems that the high output characteristics were improved because the void structure within the porous heat-resistant layer was improved by some action.

Example 41, in which the porous heat-resistant layer was constituted by nonwoven fabric, had a somewhat high insulation failure rate, but has high mechanical strength and thus was excellent in terms of handleability.

As described above, the porous heat-resistant layer has somewhat low mechanical strength. Therefore, when the porous heat-resistant layer was provided on the surface of the positive electrode or the porous resin membrane, as in Examples 22 to 32, the voltage failure rate was lower than when the independent sheet constituted by the porous heat-resistant layer was used as in Examples 33 to 35.

When the porous heat-resistant layer was provided on the surface of the porous resin membrane, the storage characteristics tended to decrease if the porous heat-resistant layer was disposed on the negative electrode side, as in Examples 25 to 27. Better storage characteristics were achieved when the porous heat-resistant layer was disposed on the positive electrode side, as in Examples 22 to 24 and 28 to 32. It seems that disposing the porous heat-resistant layer on the positive electrode side enables suppression of oxidation of the porous resin membrane comprising a polyolefin, thus preventing a reduction in electric characteristics, even when the battery was stored in a state of high temperature and high voltage.

Favorable results were obtained when the separator layer had a thickness in the range of 10 to 20 μm. In the case of Example 18, in which the separator layer had a thickness of less than 10 μm, the insulation failure rate was high. In the cases of Examples 19, 32 and 38, in which the separator layer had a thickness exceeding 20 μm, the energy density of the electrode group was decreased even when using the same negative electrode active material. In addition, the high output characteristics tended to decrease. Further, in the case of Example 38, there was observed an increase in the voltage failure rate, partly due to the effect of the mechanical strength of the independent sheet constituted by the porous heat-resistant layer.

Regardless of the presence or absence of the porous resin membrane, favorable results were observed when the porous heat-resistant layer had a thickness in the range of 1 to 20 μm. The deficiencies observed when the thickness of the porous heat-resistant layer exceeded 20 μm were caused by the same reason as Example 38. When the thickness of the porous heat-resistant layer was less than 1 μm, the heat generation during the nail penetration test became relatively significant.

Favorable results were obtained when the porous resin membrane had a thickness in the range of 8 to 18 μm. The deficiencies observed when the thickness of the porous resin membrane was less than 8 μm or larger than 18 μm were caused by the same reasons as Examples 18, 19, 32 and 38.

The lithium secondary battery of the present invention has a high energy density and a high level of safety, so that it is highly applicable to the power sources for portable devices such as personal digital assistants and mobile electronic devices. However, the lithium secondary battery of the present invention can also be used for, for example, compact home electrical energy storage devices, and the power sources for motorcycles, electric cars and hybrid electric cars, and there is no particular limitation with respect to its use. While there is no particular limitation with respect to the shape of the lithium ion secondary battery of the present invention, a cylindrical shape and a square shape are preferable, for example.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium secondary battery comprising: a wound electrode group, a non-aqueous electrolyte and a battery case housing said wound electrode group and said non-aqueous electrolyte, said wound electrode group including a positive electrode, a negative electrode and a separator layer interposed between said positive electrode and said negative electrode,
   wherein an end-of-charge voltage and an end-of-discharge voltage are set in such a manner that said electrode group has an energy density of not less than 700 Wh/L,
   said separator layer includes a porous heat-resistant layer and a porous resin membrane,
   said porous heat-resistant layer is adhered on a surface of said positive electrode,
   said negative electrode includes at least one selected from the group consisting of a lithium metal and a substance capable of being alloyed with lithium,
   said separator layer has a thickness of 10 to 20 μm,
   said porous heat-resistant layer has a thickness of 1 to 5 μm, and
   said porous resin membrane has a thickness of 8 to 18 μm.

2. The lithium secondary battery in accordance with claim 1,
wherein said porous heat-resistant layer has an area larger than that of an active material layer of said negative electrode.

3. The lithium secondary battery in accordance with claim 1,
wherein said porous heat-resistant layer includes an insulating filler and a binder.

4. The lithium secondary battery in accordance with claim 1,
wherein said porous heat-resistant layer includes a heat-resistant resin.

5. The lithium secondary battery in accordance with claim 1,
wherein said positive electrode includes a lithium-containing composite oxide containing Ni element.

6. The lithium secondary battery in accordance with claim 1,
wherein said end-of-charge voltage is set to a voltage higher than 4.2 V.

7. A lithium secondary battery comprising: a wound electrode group, a non-aqueous electrolyte and a battery case housing said wound electrode group and said non-aqueous electrolyte, said wound electrode group including a positive electrode, a negative electrode and a separator layer interposed between said positive electrode and said negative electrode,
wherein an end-of-charge voltage and an end-of-discharge voltage are set in such a manner that said electrode group has an energy density of not less than 700 Wh/L,
said separator layer includes a porous heat-resistant layer and a porous resin membrane,
said porous heat-resistant layer is adhered on a surface of said porous resin membrane facing the positive electrode,
said negative electrode includes at least one selected from the group consisting of a lithium metal and a substance capable of being alloyed with lithium,
said separator layer has a thickness of 10 to 20 μm,
said porous heat-resistant layer has a thickness of 2 to 5 μm, and
said porous resin membrane has a thickness of 8 to 18 μm.

8. The lithium secondary battery in accordance with claim 7,
wherein said porous heat-resistant layer has an area larger than that of an active material layer of said negative electrode.

9. The lithium secondary battery in accordance with claim 7,
wherein said porous heat-resistant layer includes an insulating filler and a binder.

10. The lithium secondary battery in accordance with claim 7,
wherein said porous heat-resistant layer includes a heat-resistant resin.

11. The lithium secondary battery in accordance with claim 7,
wherein said positive electrode includes a lithium-containing composite oxide containing Ni element.

12. The lithium secondary battery in accordance with claim 7,
wherein said end-of-charge voltage is set to a voltage higher than 4.2 V.

* * * * *